(12) United States Patent
Kadoto et al.

(10) Patent No.: US 8,953,678 B2
(45) Date of Patent: Feb. 10, 2015

(54) MOVING PICTURE CODING APPARATUS

(75) Inventors: Tadakazu Kadoto, Tokyo (JP); Masatoshi Kondo, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 792 days.

(21) Appl. No.: 12/591,438

(22) Filed: Nov. 19, 2009

(65) Prior Publication Data

US 2010/0177821 A1 Jul. 15, 2010

(30) Foreign Application Priority Data

Jan. 13, 2009 (JP) ................................. 2009-004588

(51) Int. Cl.
 *H04N 11/02* (2006.01)
 *H04N 19/105* (2014.01)
 *H04N 19/176* (2014.01)
 *H04N 19/593* (2014.01)

(52) U.S. Cl.
 CPC ........... *H04N 19/105* (2014.11); *H04N 19/176* (2014.11); *H04N 19/593* (2014.11)
 USPC .................................................. 375/240.12

(58) Field of Classification Search
 CPC .......... H04N 7/26021; H04N 7/26026; H04N 7/26031; H04N 7/5086; H04N 7/34; H04N 19/0003; H04N 19/00042; H04N 19/00763
 See application file for complete search history.

(56) References Cited

U.S. PATENT DOCUMENTS

| | | | | |
|---|---|---|---|---|
| 6,134,352 A * | 10/2000 | Radha et al. | ................... | 382/254 |
| 8,208,563 B2 * | 6/2012 | Dane et al. | ................ | 375/240.27 |
| 8,472,522 B2 * | 6/2013 | Matsuo et al. | ............ | 375/240.13 |
| 2001/0017942 A1 * | 8/2001 | Kalevo et al. | .................. | 382/238 |
| 2005/0243920 A1 * | 11/2005 | Murakami et al. | ........ | 375/240.12 |
| 2006/0072676 A1 * | 4/2006 | Gomila | ..................... | 375/240.27 |
| 2007/0053443 A1 * | 3/2007 | Song | ........................ | 375/240.24 |
| 2009/0034617 A1 * | 2/2009 | Tanaka | ..................... | 375/240.13 |
| 2009/0141798 A1 * | 6/2009 | Adachi et al. | ............ | 375/240.12 |
| 2010/0118943 A1 * | 5/2010 | Shiodera et al. | .......... | 375/240.12 |

FOREIGN PATENT DOCUMENTS

| | | |
|---|---|---|
| JP | 02-219390 | 8/1990 |
| JP | 2006-352181 | 12/2006 |
| JP | 2008-166816 | 7/2008 |

OTHER PUBLICATIONS

The Japanese Office Action dated Jun. 19, 2012 and the English translation thereof.

* cited by examiner

*Primary Examiner* — Christopher S Kelley
*Assistant Examiner* — Christopher Findley
(74) *Attorney, Agent, or Firm* — Bacon & Thomas, PLLC

(57) ABSTRACT

A moving picture coding apparatus divides a picture into basic blocks and generates a prediction image of a block to be predicted in a basic block by using adjacent pixels in reference pixel blocks adjacent to the block to be predicted as reference pixels to perform predictive coding of a moving picture. When some of the reference pixels are not available, pixel values of the reference pixels that are not available are calculated based on pixels in the reference pixel blocks. The prediction image of the block to be predicted is generated by using the calculated pixel values instead of the reference pixels that are not available.

8 Claims, 20 Drawing Sheets

16×16 PIXELS

<4×4 INTRA-PREDICTION>

<8×8 INTRA-PREDICTION>

UPPER REFERENCE PIXEL BLOCK

Ave(a_1~a_4) : AVERAGE VALUE

REFERENCE PIXEL BLOCK

I=M+ △Ave(a_1~a_4, a_1)

BLOCK TO BE PREDICTED

4×4 PIXELS

4×4 PIXELS (1801) AU DELIMITER : ACCESS UNIT DELIMITER
(1802) SPS : SEQUENCE PARAMETER SET
(1803) PPS : PICTURE PARAMETER SET
(1804) SEI : SUPPLEMENT ENHANCED INFORMATION
(1805) PCP : PRIMARY CODED PICTURE
(1806) RCP : REDUNDANT CODED PICTURE
(1807) EOS : END OF SEQUENCE
(1808) EOS : END OF STREAM

MOVING PICTURE CODING APPARATUS

FIELD OF THE INVENTION

The present invention relates to a moving picture coding apparatus; and more particularly, to a moving picture coding apparatus capable of increasing prediction accuracy when intra- or inter-prediction is performed in pixel blocks based on the standards such as MPEG-2 and H.264.

BACKGROUND OF THE INVENTION

Nowadays, the amount of data transmitted in the form of a moving picture is increasing day by day. For example, let's consider the amount of data of an analog television. Currently, in the case of digitizing Japanese standard television broadcasting, the number of pixels is 720 in a horizontal direction and is 480 in a vertical direction. Each pixel has a luminance component of 8 bits and two chrominance components of 8 bits. A moving picture has stage main body 30 frames per one second. Currently, since a data ratio of a chrominance component to the luminance component is 1/2, the amount of data for one second is 720×480×(8+8×1/2+8×1/2)×30=124,416,000 bits and a transmission rate of about 120 Mbps is required.

Further, an optical fiber currently supplied as a home broadband has a transmission rate of about 100 Mbps and thus an image cannot be transmitted without compression. The amount of data of terrestrial digital television broadcasting to replace in 2011 is known as 1.5 Gbps. Accordingly, a highly efficient compression technology may be regarded as one of technologies required in the future. Currently, H.264/AVC (hereinafter, referred to as H.264) is suggested as the standard of the highly efficient compression technology. H.264 is the up-to-date international standard of moving picture coding developed by the joint video team (JVT) commonly established in December, 2001 by the video coding experts group (VCEG) of the international telecommunication union telecommunication standardization sector (ITU-T) and the moving picture experts group (MPEG) of the international organization for standardization (ISO)/international electrotechnical commission (IEC).

ITU-T recommendations were admitted in May, 2003. In addition, the ISO/IEC/joint technical committee (JTC) 1 was standardized as MPEG-4 part 10 advanced video coding (AVC) in 2003.

H.264 is characterized in that the same picture quality can be realized by coding efficiency which is about twice as high as that of the conventional MPEG-2 and MPEG-4, that inter frame prediction, quantization, and entropy coding are adopted as a compression algorithm, and that H.264 can be widely used not only at a low bit rate of a mobile telephone or the like but also at a high bit rate of a high vision TV or the like.

In addition, the ITU-T recommendations can be downloaded from the URL stated in the following Non-Patent Document 1.

[Non-Patent Document 1] "ITU-T Recommendation H.264 Advanced video coding for generic audiovisual services", [online], November 2007, TELECOMMUNICATION STANDARDIZATION SECTOR OF ITU [searched on Dec. 12, 2008], the Internet <URL: http://www.itu.int/rec/T-REC-H.264-200711-I/en>

In order to describe problems to be solved by the present invention, a prediction method of H.264 will be simply described with reference to FIGS. 1 to 3B.

In H.264, intra-prediction 104 for generating an intra-prediction image predicted by using correlations within a picture and inter-prediction 105 for generating an inter-prediction image predicted by using correlations between pictures are performed. A difference between the generated prediction image and an input picture 101 is obtained, and orthogonal transform, e.g., discrete cosine transform (DCT), 102 and quantization (Q) 103 are performed on the differential data. Then, coding 110 is performed on the quantized data. In H.264, only the differential data is coded and transmitted, thereby realizing high coding efficiency.

Here, the reference numeral 107 indicates a deblocking filter standardized in H.264, and the reference numeral 108 is inverse orthogonal transform, e.g., inverse discrete cosine transform (IDCT), for performing an inverse processing to the processing of the orthogonal transform 102. Further, the reference numeral 109 indicates inverse quantization (IQ) for performing an inverse processing to the processing of the quantization 103. The filter 107, the inverse orthogonal transform 108 and the inverse quantization 109 perform the processing to obtain reconstructed pictures in an encoder. The reconstructed pictures for a plurality of previous frames are stored in a frame memory 106 and are retrieved to the inter-prediction 105.

The intra-prediction generates the prediction picture based on a correlation between adjacent pixels. In the intra-prediction, the prediction picture is generated by using correlations between a pixel to be predicted and its adjacent pixels, wherein pixels in a left column and an upper row of a block to be predicted are used. In FIG. 2, for example, reference pixels used for generating a prediction picture of 4×4 intra-prediction are illustrated.

In H.264/AVC, it is possible to generate prediction pictures on a basis of block of 4×4 pixels (hereinafter, referred to as 4×4 block), 8×8 pixels (hereinafter, referred to as 8×8 block), or 16×16 pixels (hereinafter, referred to as 16×16 block). As available modes, total 22 modes (9 modes in 4×4 blocks, 9 modes in 8×8 blocks and 4 modes in 16×16 blocks) can be used.

The intra-prediction modes of H.264/AVC in the respective blocks are illustrated in the following Table 1.

TABLE 1

| Intra-prediction Modes | | | |
|---|---|---|---|
| Intra 4× process chamber 4/Intra 8 × 8 | | Intra 16 × 16 | |
| 0 | Vertical | 0 | Vertical |
| 1 | Horizontal | 1 | Horizontal |
| 2 | DC | 2 | DC |
| 3 | Diagonal Down Left | 3 | Plane |
| 4 | Diagonal Down Right | | |
| 5 | Vertical Right | | |
| 6 | Horizontal Down | | |
| 7 | Vertical Left | | |
| 8 | Horizontal Up | | |

In the modes 0 and 1, prediction is performed by using adjacent pixels. It is possible to obtain high prediction efficiency for blocks including vertical edges and horizontal edges. In the mode 2, an average value of adjacent pixels is used. In the modes 3 to 8, a weight average is obtained from every 2 to 3 pixels from adjacent pixels and is used as a prediction value. It is possible to obtain a high prediction effect for images including edges of 45 degrees to the left, 45 degrees to the right, 22.5 degrees to the right, 67.5 degrees to the right, 22.5 degrees to the left, and 112.5 degrees to the right, letting the vertically downward direction be 0 degree. In H.264, it is possible to realize highly efficient coding by selecting a proper mode from the intra-prediction modes of the images. In general, rough intra-prediction is performed to select an optimal intra-prediction mode.

In addition, although not described in detail herein, in the inter-prediction that is defined in H.264/AVC, a motion vector of a pixel to be predicted is calculated from previous and future pictures to thereby generate a prediction picture.

The adjacent pixels referred to in the intra-prediction are A to M illustrated in FIG. 2. However, when a picture edge, a slice boundary, and reference pixels are coded by the inter-prediction, reference pixels do not exist. Further, since reference beyond the slice boundary is prohibited, available modes are limited. In addition, in H.264, the intra-prediction is performed in the order of the numbers illustrated in FIGS. 3A and 3B.

The reference pixels used in the respective prediction modes are illustrated in the following Table 2.

TABLE 2

Prediction Modes and Available Reference Pixels

| Intra 4 × 4/ Intra 8 × 8 | | Available Reference Pixels | Intra 16 × 16 | | Available Reference Pixels |
| --- | --- | --- | --- | --- | --- |
| 0 | Vertical | Upper | 0 | Vertical | Upper |
| 1 | Horizontal | Left | 1 | Horizontal | Left |
| 2 | DC | Upper/Left | 2 | DC | Upper/Left |
| 3 | Diagonal Down Left | Upper/ Upper Right | 3 | Plane | Upper/Left/ Upper Left |
| 4 | Diagonal Down Right | Upper/Left/ Upper Left | | | |
| 5 | Vertical Right | Upper/Left/ Upper Left | | | |
| 6 | Horizontal Down | Upper/Left/ Upper Left | | | |
| 7 | Vertical Left | Upper/ Upper Right | | | |
| 8 | Horizontal Up | Left | | | |

As can be seen from the reference pixels used in Table 2, in the case of the 4×4 intra-prediction, since the pixels on the left/upper left do not exist at the picture edge, the modes 1, 4, 5, 6 and 8 cannot be used. Further, when the upper end of the block to be predicted is a slice boundary, the modes 0, 3, 4, 5, 6 and 7 cannot be used since the reference pixels on the upper/upper right are outside the slice boundary. In the case of the 8×8 intra-prediction, in the same way as in the 4×4 intra-prediction, 9 intra-prediction modes are defined and mode limitations due to the pixels that cannot be referred to are the same as those in the 4×4 intra-prediction. In the case of the 16×16 intra-prediction, an available mode is the mode 4 and reference pixels also do not exist in case of a picture edge and the slice boundary and reference beyond the slice boundary is also prohibited.

Further, in other cases than the above, when the reference pixels required in generating the prediction picture of the pixel block to be predicted, i.e., adjacent pixel blocks, are coded by the inter-prediction (when constrained_intra_pred_flag is '1' in H.264), it is defined that an intra-prediction picture cannot be generated with reference to such adjacent blocks.

As described above, when coding is performed based on a conventional method, limitations on available modes are generated, thereby deteriorating the accuracy of the generated prediction picture. Further, a difference value between the prediction picture and an input picture increases due to the deterioration of the accuracy of the prediction picture. As a result, in the coding 110 of FIG. 2, the amount of codes required for coding the blocks to be predicted, in which limitations on modes are generated, increases.

In the range where a transmission band is limited, particularly, in low bit rate transmission, an increase in the amount of generated codes affects entire coding.

SUMMARY OF THE INVENTION

In view of the above, the present invention provides a moving picture code compressing apparatus capable of compressing codes without increasing the amount of generated codes, furthermore, without deteriorating the accuracy of an image to be predicted when intra- or inter-prediction is performed in units of pixel blocks.

In the prediction performed by the moving picture coding apparatus in accordance with the present invention, when some of reference pixels in a block to be predicted are not available, the pixels values of the reference pixels that are not available are calculated based on the pixels in the reference pixel block to generate a prediction picture of the block to be predicted by using the calculated pixel values instead of the reference pixels that are not available.

Then, an average value of some pixels in the reference pixel block and difference values thereof are obtained. The pixel values of the corresponding reference pixels are obtained based on the obtained average value and difference values.

In accordance with the embodiment of the present invention, it is possible to provide a moving picture code compressing apparatus capable of compressing codes without increasing the amount of generated codes, furthermore, without deteriorating the accuracy of a prediction picture when intra- or inter-prediction is performed in pixel blocks.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE EMBODIMENTS

Hereinafter, an embodiment of the present invention will be described with reference to FIGS. 4 to 23 which form a part hereof.

In accordance with the embodiment of the present invention, in a data compressing process performed by a moving picture coding apparatus, when image prediction is performed, data on the pixels that cannot be referred to due to the position conditions of a block to be predicted are padded so as to be used as the reference pixels of the block to be predicted.

To be more specific, in accordance with the present invention, in generating a prediction image, when upper or left reference pixels are available and pixels on the other side are not available, even if the pixels at a picture edge and at a slice end or adjacent pixels are coded by inter-prediction by performing padding based on a pixel average and a pixel difference using the available reference pixel blocks, proper reference pixels are generated regardless of limitations on the prediction generated by prediction image generation modes. Therefore, when the upper or left reference pixels are available, all of the modes are available even for the pixels at the picture edge and on the slice boundary, so that a highly dense prediction image can be generated. In this way, in accordance with the embodiment of the present invention, a difference between the prediction image and an input image is reduced to thereby improve coding efficiency.

Hereinafter, the outline of padding in the prediction of the moving picture coding apparatus in accordance with the present invention will be described with reference to FIGS. 4 to 7.

Figure 4:
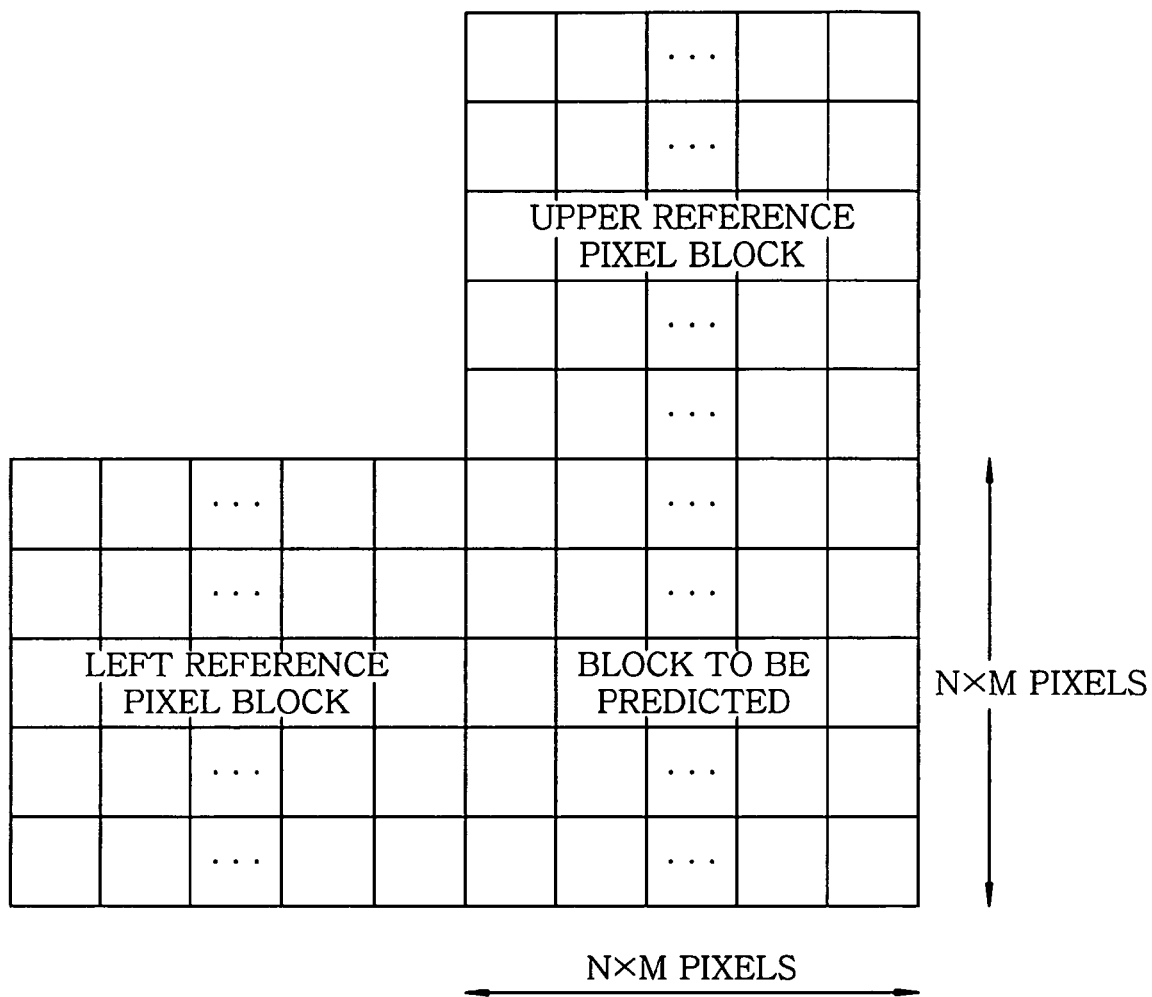
FIG. 4 illustrates a relationship between a reference pixel block and a block to be predicted.

In accordance with the embodiment of the present invention, when an upper or left reference pixel block of the block to be predicted illustrated in FIG. 4 cannot be referred to, one reference pixel block is padded from the other reference pixel block.

Figure 5:
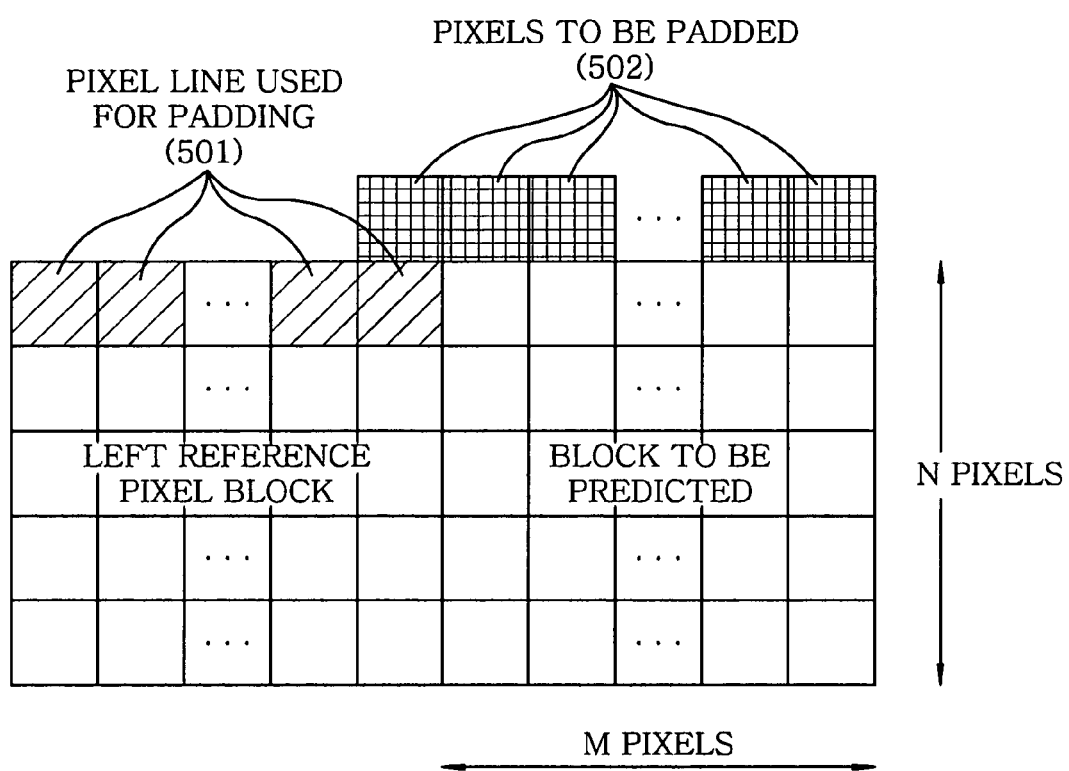
FIG. 5 illustrates a relationship between a pixel line used for padding and pixels (in a horizontal direction) to be padded in accordance with an embodiment of the present invention.
Figure 6:
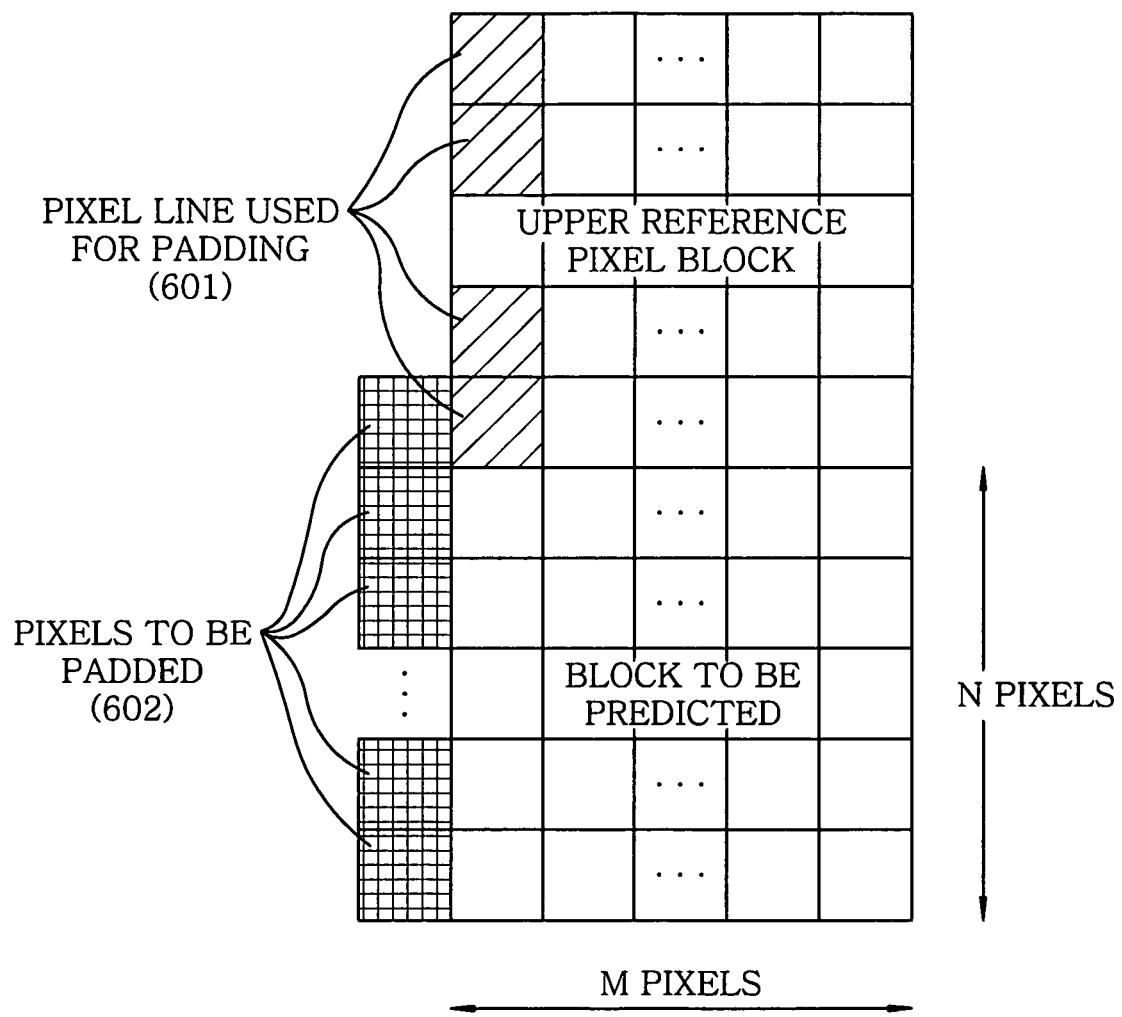
FIG. 6 illustrates a relationship between a pixel line used for padding and pixels (in a vertical direction) to be padded in accordance with the embodiment of the present invention.

More specifically, as illustrated in FIGS. 5 and 6, padding is performed by using the available reference pixel lines 501 and 601 closest to pixels 502 and 602 to be padded. Here, pixels to be padded in a horizontal direction and a pixel line required for performing padding are illustrated in FIG. 5, and pixels to be padded in a vertical direction and a pixel line required for performing padding are illustrated in FIG. 6.

Figure 7:
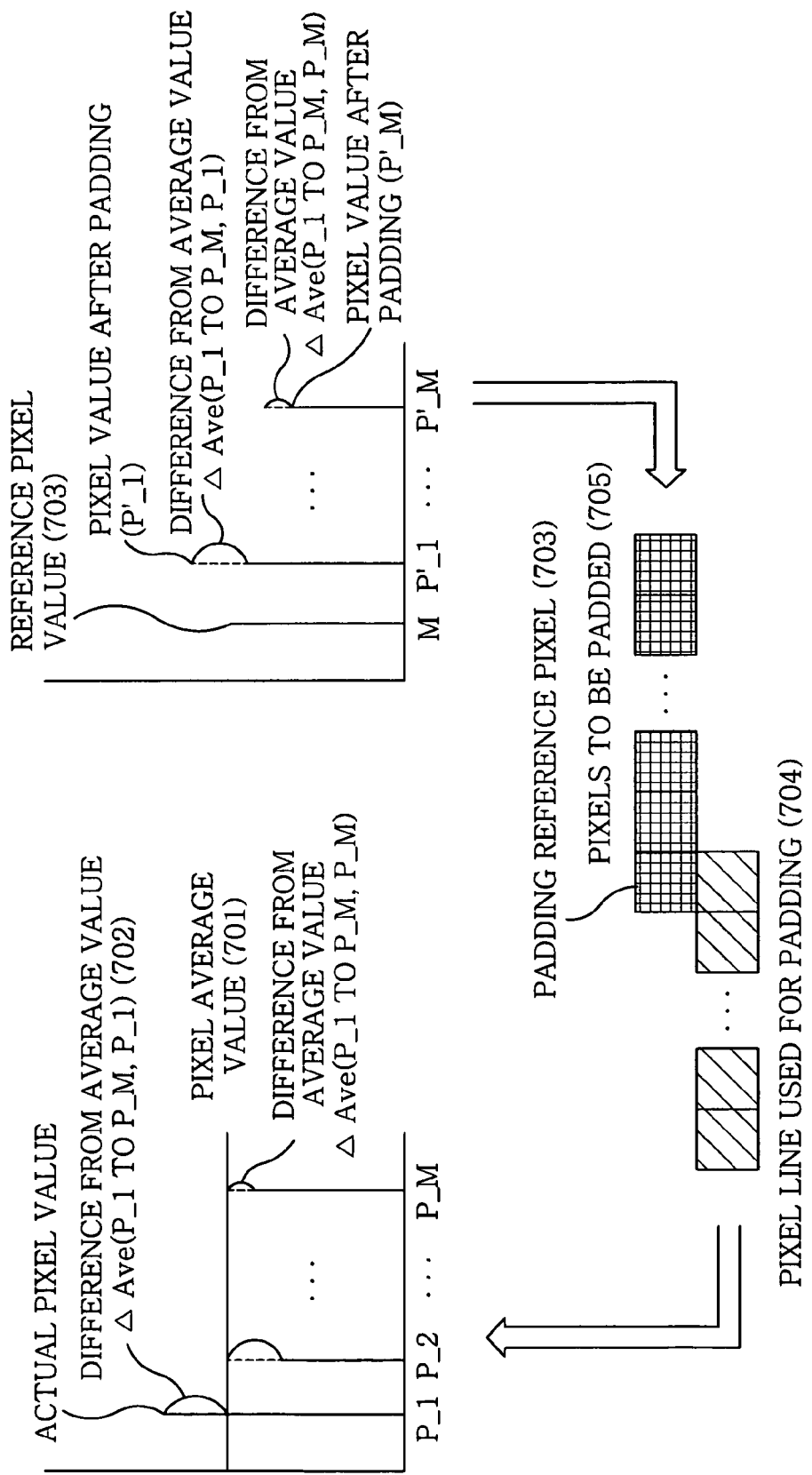
FIG. 7 illustrates the outline of a padding algorithm in image prediction in accordance with the present invention.

The basic padding in the image prediction in accordance with the embodiment of the present invention is to generate pixels 705 to be padded from a padding reference pixel line 704 illustrated in FIG. 7. First, a pixel average value 701 of the padding pixel line is obtained. Next, differences 702 between the respective pixel values and the pixel average value 701 are obtained. Then, a padding reference pixel 703 of the pixel to be padded is determined. Based on the padding reference pixel 703, at the respective pixels to be padded, the padding reference pixel 703 and the differences 702 are added to obtain final values of the pixels to be padded. In FIG. 7, the padding in the horizontal direction is illustrated. When the padding in the vertical direction is performed, the reference pixel line and the pixels to be padded are arranged in the vertical direction.

Hereinafter, the padding in the image prediction of the moving picture coding apparatus in accordance with the embodiment of the present invention will be described in detail with reference to FIGS. 8 to 18.

Figure 1:
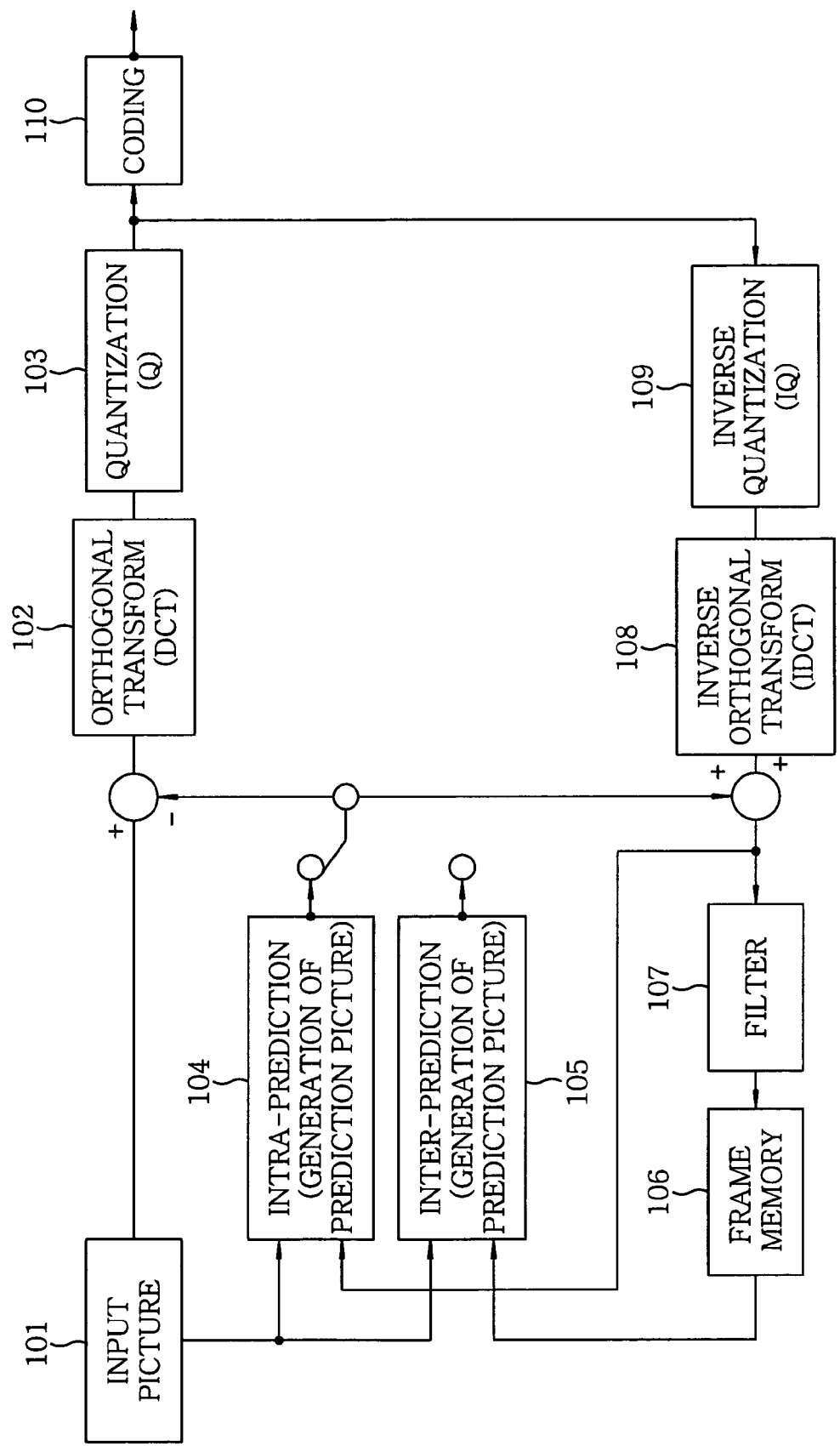
FIG. 1 is a configuration diagram of an encoder of H.264.
Figure 2:
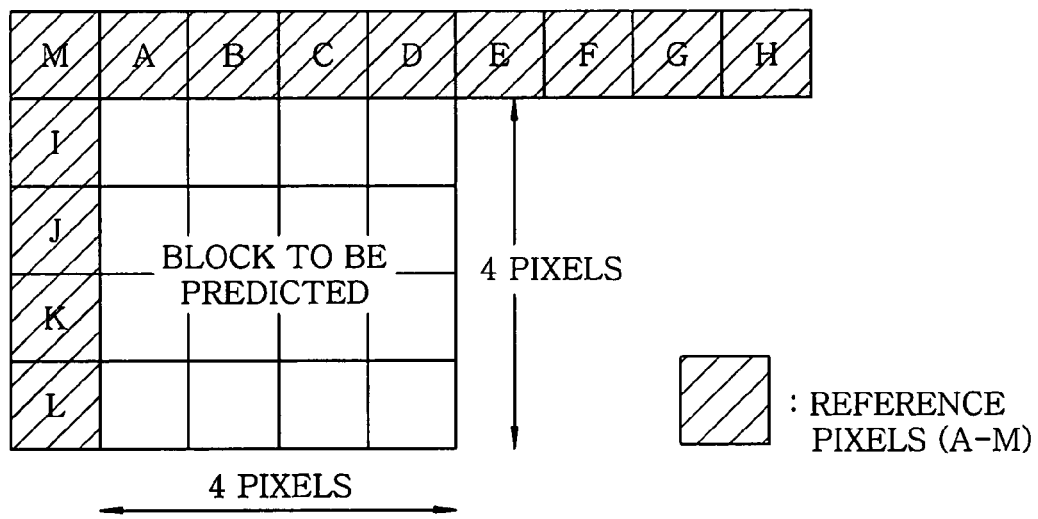
FIG. 2 illustrates positions of reference pixels in generating an intra-prediction picture.
Figure 3A:
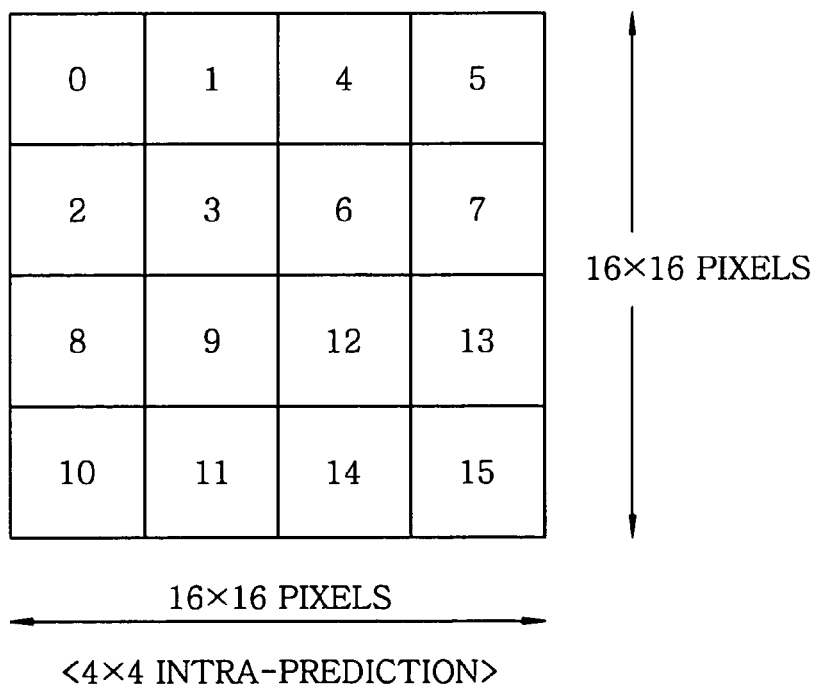
FIGS. 3A and 3B illustrate the order of intra-prediction in a block in H.264.
Figure 3B:
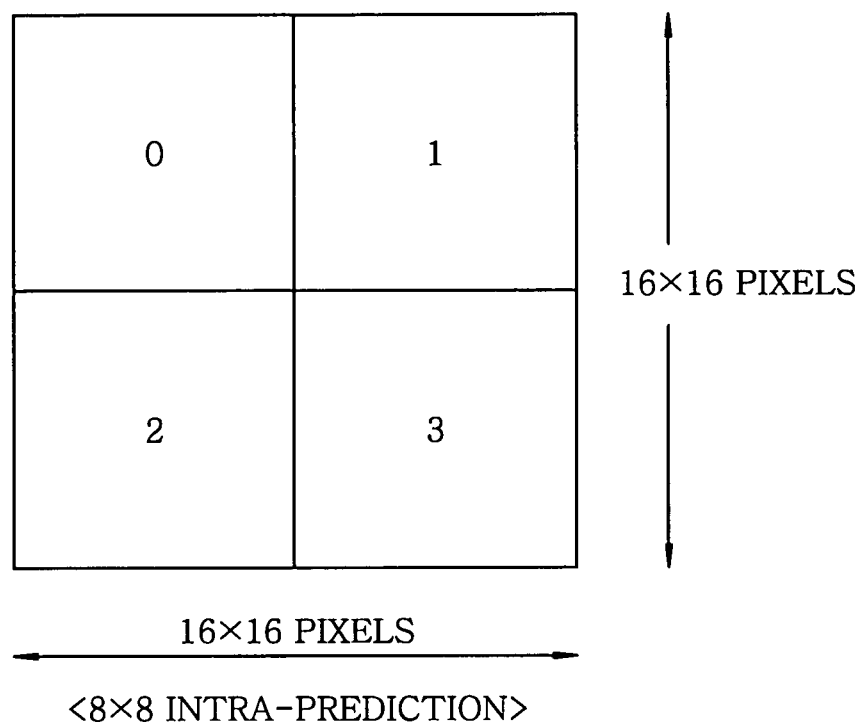

Also in this embodiment, in the same way as in H.264/AVC, intra-prediction is performed in the order of the numbers illustrated in FIGS. 3A and 3B. Further, in this embodiment, 4×4 intra-prediction will be taken as an example. In a padding method of the image prediction in accordance with the embodiment of the present invention, the padding is performed by using a macroblock including available reference pixels, a pixel average, and a pixel difference. The padding can be also performed in an 8×8 block and in a 16×16 block by using the same method as in the 4×4 block described in this embodiment.

Figure 9:
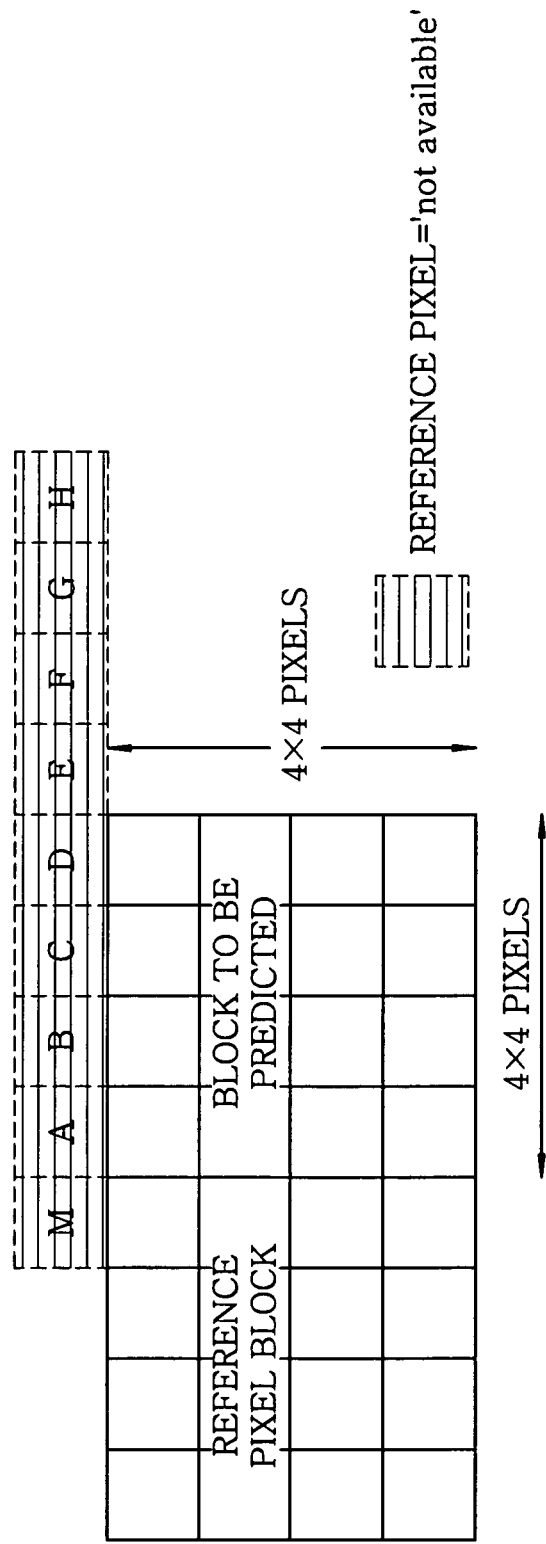
FIG. 9 illustrates a reference pixel block and a block to be predicted when the upper reference pixels are not available.

First of all, padding in a case where upper pixels of FIG. 9 cannot be referred to will be described.

Figure 8:
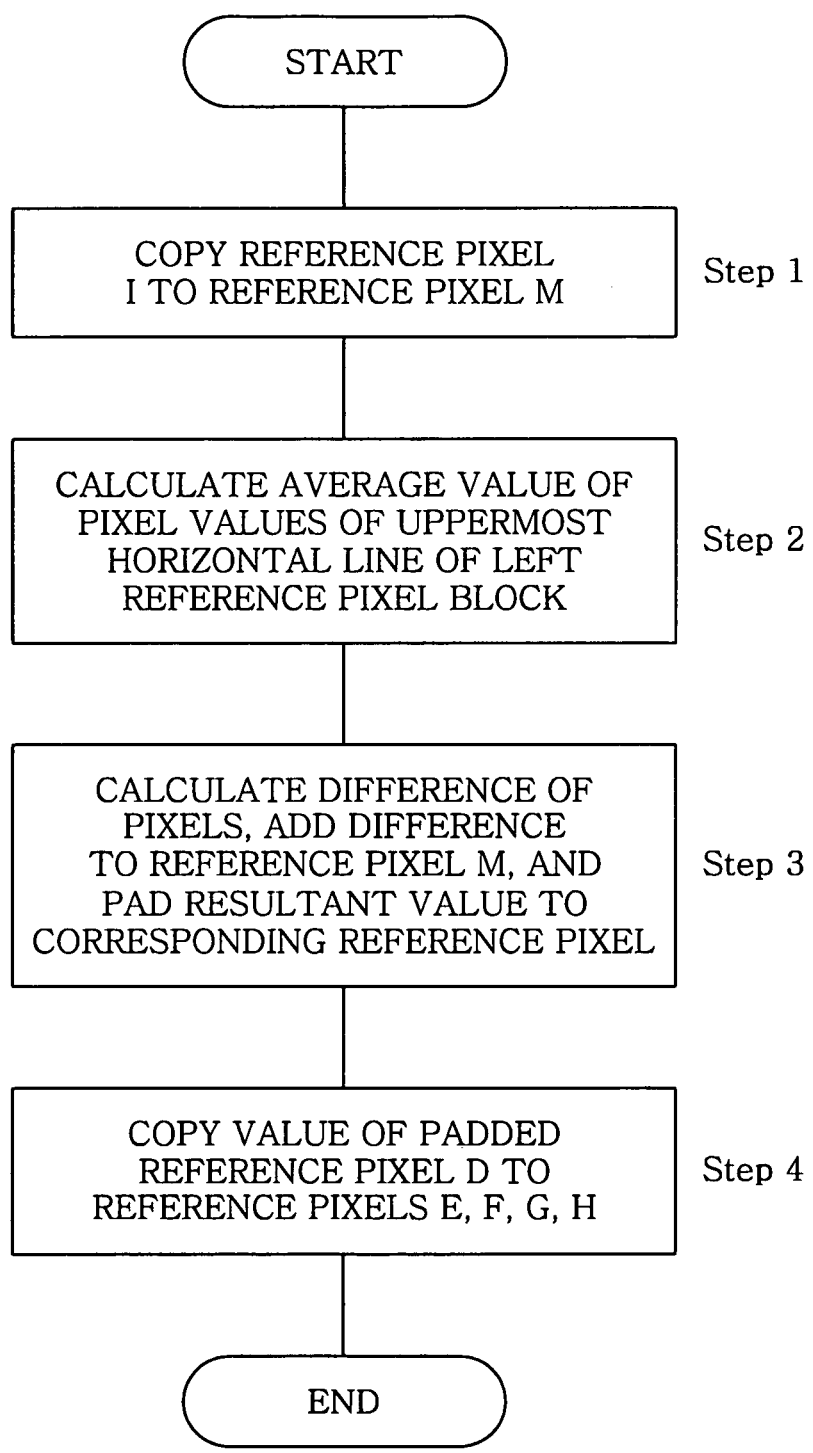
FIG. 8 is a flowchart illustrating the flow of padding when upper reference pixels are not available.
Figure 10:
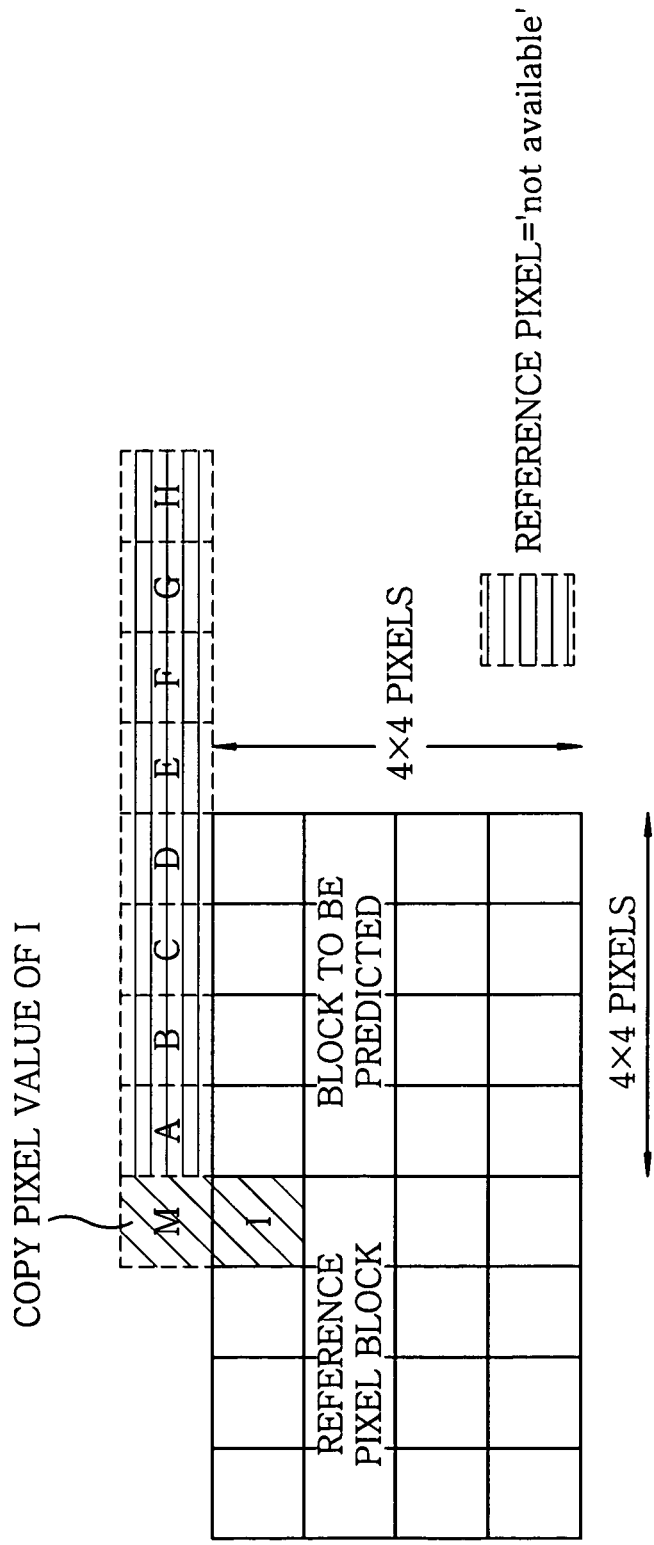
FIG. 10 illustrates that the reference pixels are padded in the horizontal direction (step 1) in the relationship between the reference pixel block and the block to be predicted of FIG. 4.
Figure 11:
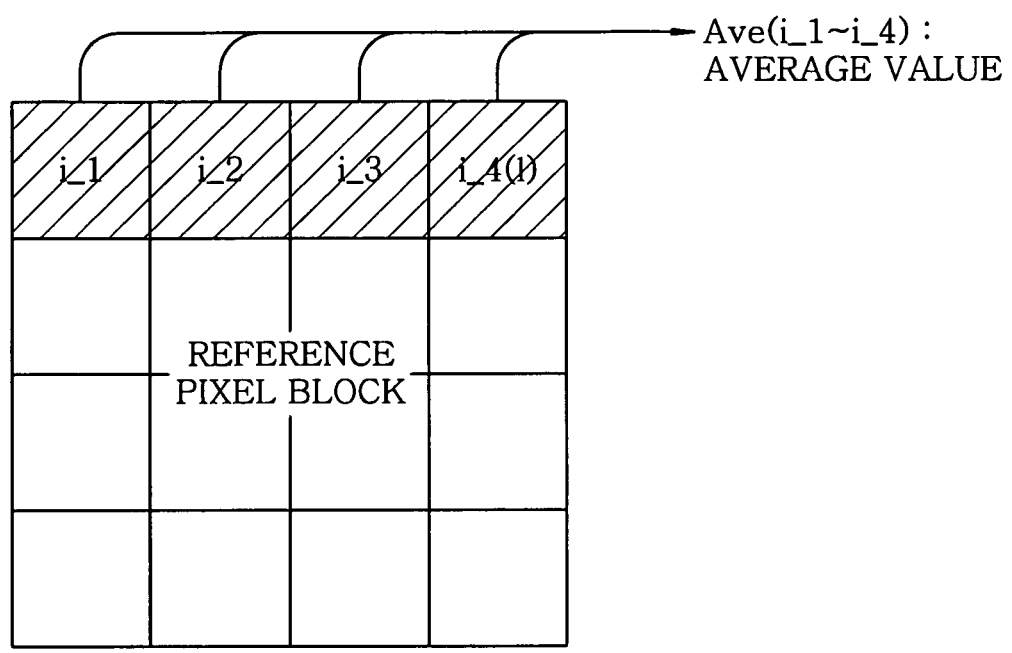
FIG. 11 illustrates that the reference pixels are padded in the horizontal direction (step 2) in the relationship between the reference pixel block and the block to be predicted of FIG. 4.

First, as illustrated in FIG. 10, an uppermost reference pixel I of left 4 pixels is copied to the position of a reference pixel M (step 1 of FIG. 8).

Next, an average value Ave(i__1 to i__4) of the pixel values in the uppermost horizontal line (i__1 to i__4 of FIG. 11) of a left reference pixel block is calculated by the following Eq. 1 (step 2):

$$Ave(i\_1 \text{ to } i\_N) = \frac{\sum_{i=1}^{N} \text{pixel value } Xi}{N}, \quad \text{Eq. 1}$$

where N=4 in this example.

Then, differences ΔAve(i__1 to i__4, i_x) between the respective pixels in the uppermost horizontal line of the reference pixel block and the average value obtained by Eq. 1 are calculated by the following Eq. 2:

$$\Delta Ave(i\_1 \text{ to } i\_N, i\_x) = i\_x - \frac{\sum_{i=1}^{N} \text{pixel value } Xi}{N}, \quad \text{Eq. 2}$$

where N=4 in this example.

Figure 12:
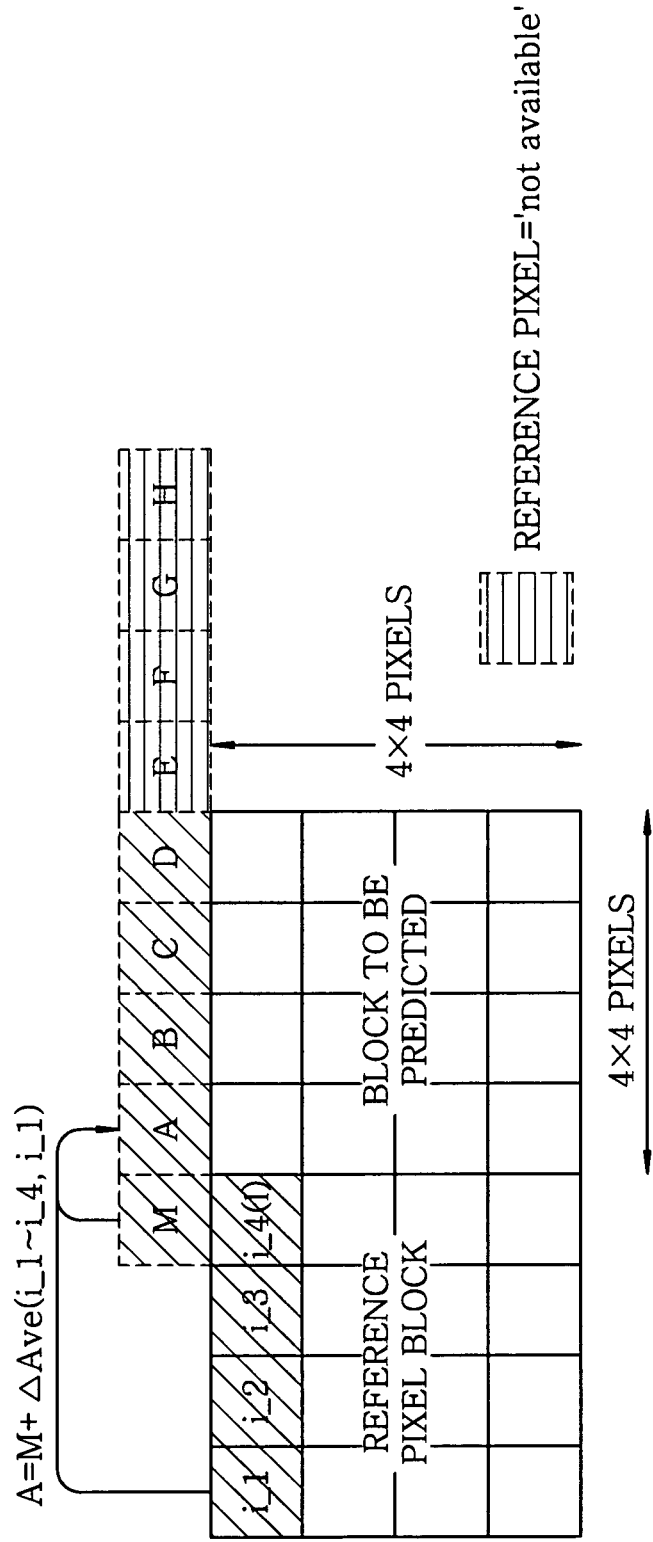
FIG. 12 illustrates that the reference pixels are padded in the horizontal direction (step 3) in the relationship between the reference pixel block and the block to be predicted of FIG. 4.

Subsequently, the differences of Eq. 2 are added to the pixel value of the copied reference pixel M to pad resultant values to the respective corresponding positions as the values of the upper reference pixels (step 3). In FIG. 12, an example of padding a reference pixel A is illustrated.

Figure 13:
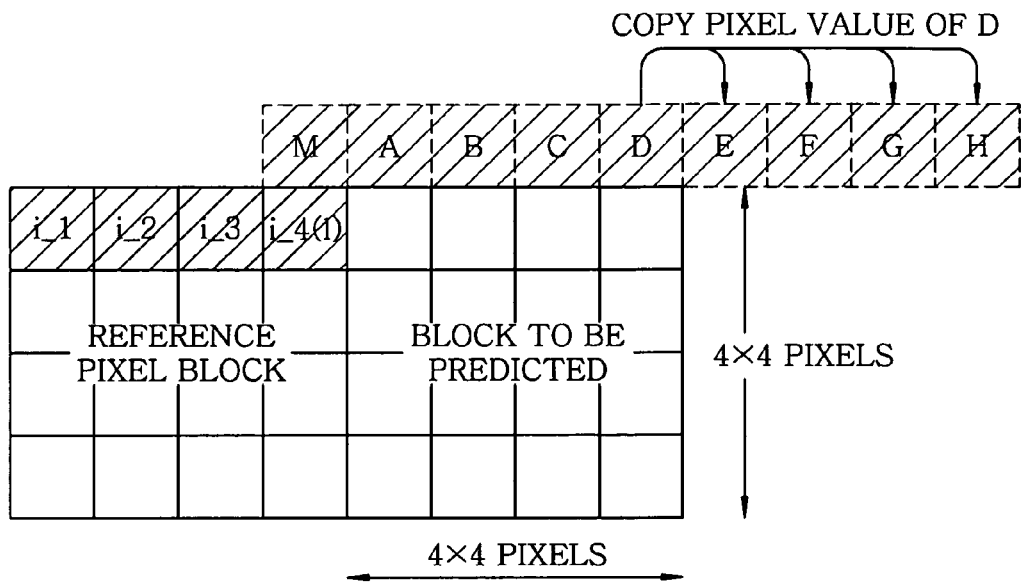
FIG. 13 illustrates that the reference pixels are padded in the horizontal direction (step 4) in the relationship between the reference pixel block and the block to be predicted of FIG. 4.

In a block to be predicted, upper right reference pixels are not available at the positions of 1, 3, 4, 5, 7, 11, 13, and 15 illustrated in FIG. 3A. Accordingly, the pixel values of EFGH cannot be predicted in view of the standards. Therefore, as illustrated in FIG. 13, the pixel value of the rightmost pixel D of the upper reference pixels is copied to set it as EFGH (step 4).

The upper reference pixels are padded by the processes of steps 1 to 4. Since the reference pixels become available, a prediction image is generated by all of the modes using the upper reference pixels as "available for Intra__4×4 prediction".

Figure 15:
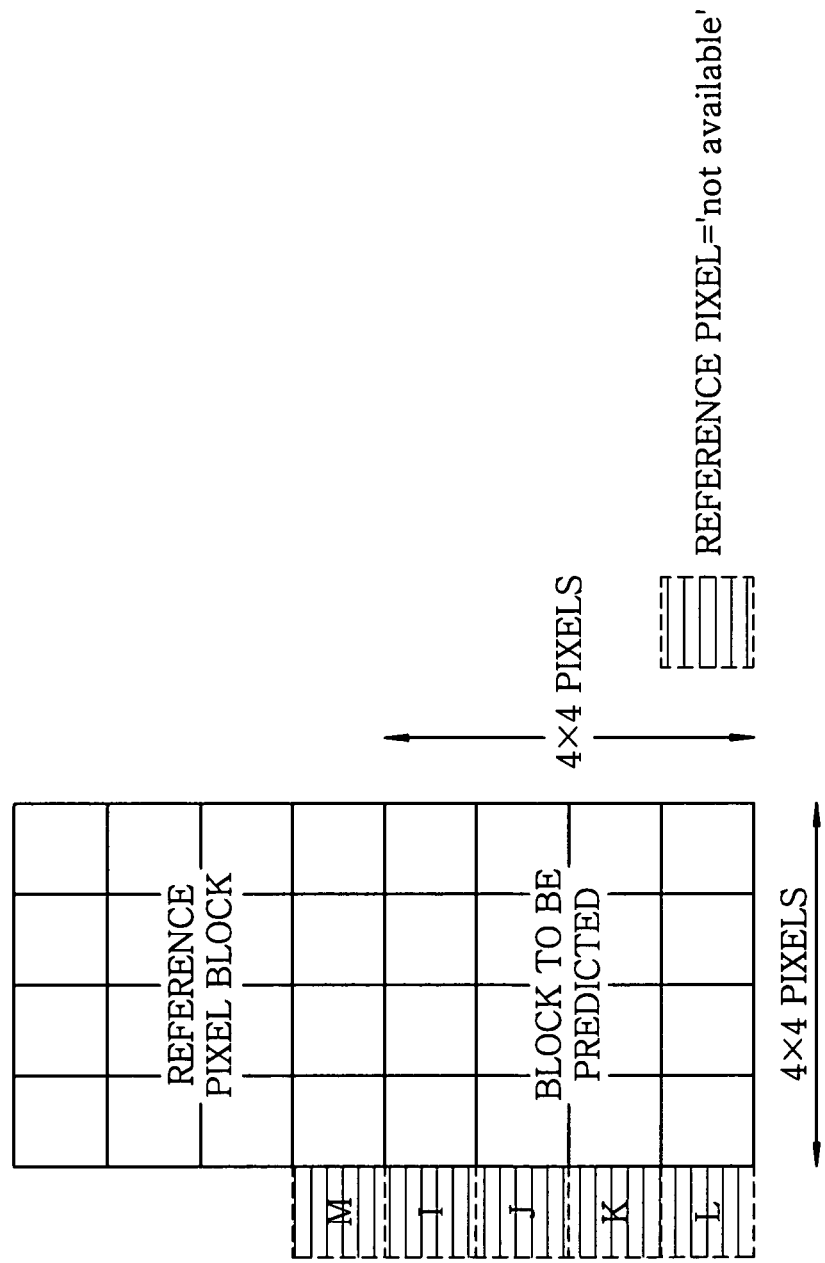
FIG. 15 illustrates a reference pixel block and a block to be predicted when the left reference pixels are not available.

Next, padding in a case where left pixels of FIG. 15 cannot be referred to will be described.

Figure 14:
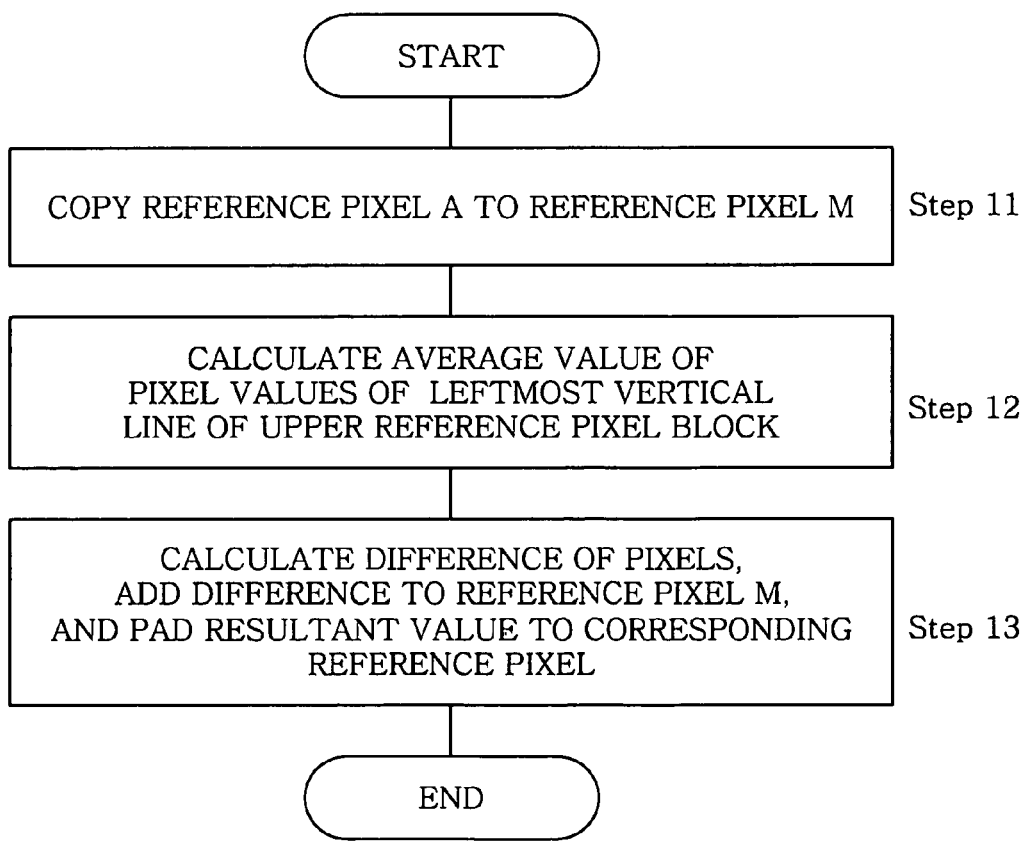
FIG. 14 is a flowchart illustrating the flow of padding when left reference pixels are not available.
Figure 16:
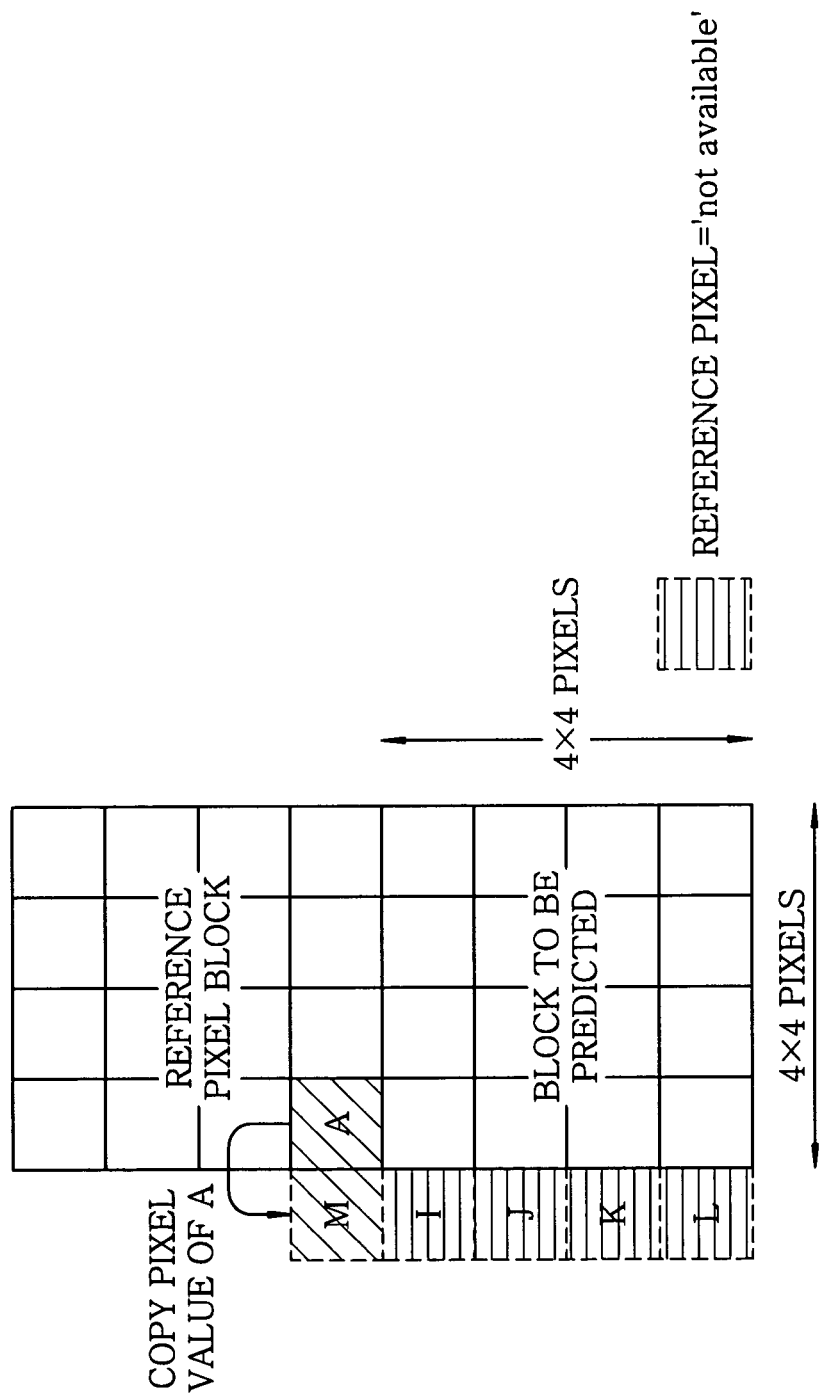
FIG. 16 illustrates that the reference pixels are padded in the vertical direction (step 1) in the relationship between the reference pixel block and the block to be predicted of FIG. 4.
Figure 17:
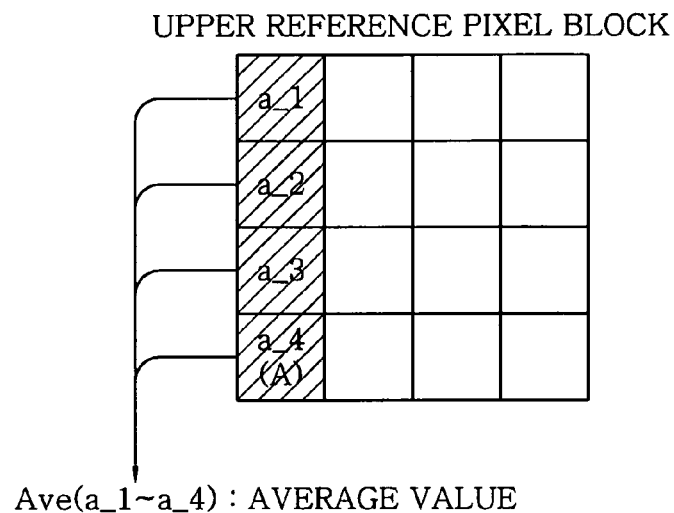
FIG. 17 illustrates that the reference pixels are padded in the vertical direction (step 2) in the relationship between the reference pixel block and the block to be predicted of FIG. 4.

First, as illustrated in FIG. 16, the leftmost reference pixel A of upper 4 pixels is copied to the position of the reference pixel M (step 11 of FIG. 14).

Then, an average value Ave(a__1 to a__4) of the pixel values (a__1 to a__4 of FIG. 17) in the leftmost vertical line of an upper reference pixel block is calculated by the following Eq. 3 (step 12 of FIG. 14):

$$Ave(a\_1 \text{ to } a\_N) = \frac{\sum_{i=1}^{N} \text{pixel value } Xi}{N}, \quad \text{Eq. 3}$$

where N=4.

Next, in this example, differences ΔAve(a__1 to a__4, a_x) between the pixel values in the leftmost vertical line of the reference pixel block and the average value obtained by Eq. 3 are calculated by the following Eq. 4:

$$\Delta Ave(a\_1 \text{ to } a\_N, a\_x) = a\_x - \frac{\sum_{i=1}^{N} \text{pixel value } Xi}{N}, \quad \text{Eq. 4}$$

where N=4. Then, the differences are added to the pixel value of M to pad resultant values to the respective corresponding positions of the left reference pixels.

Figure 18:
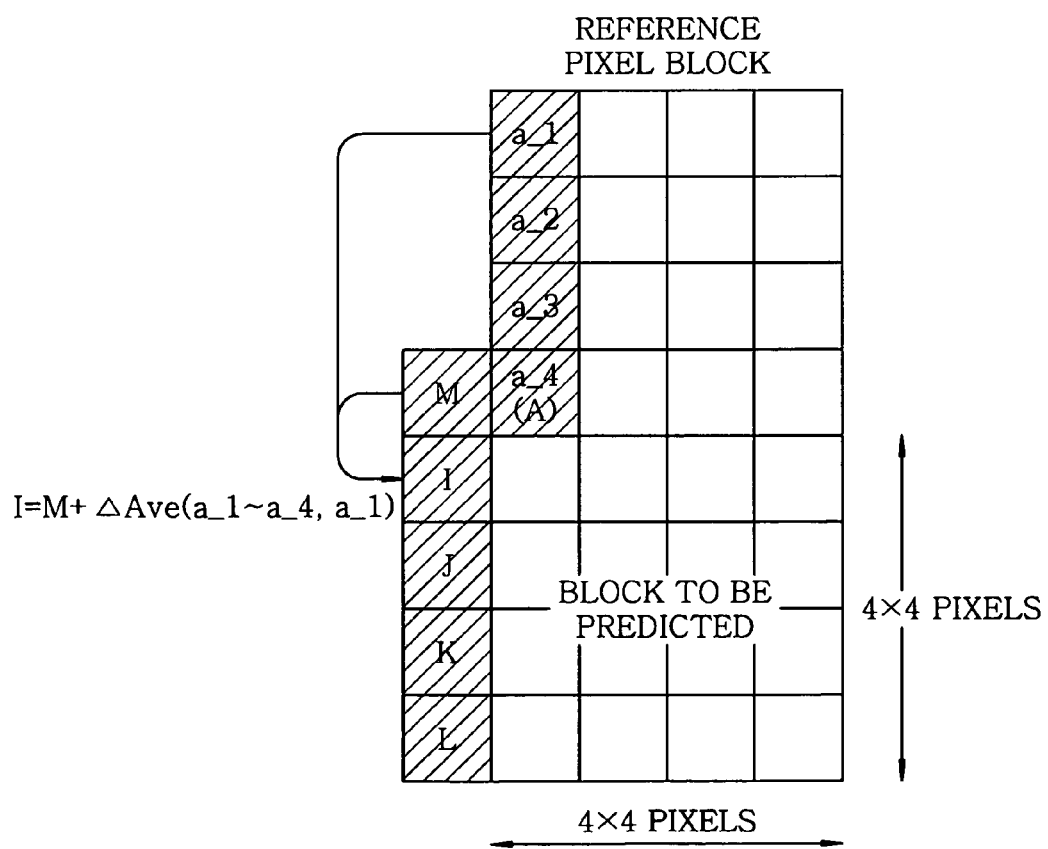
FIG. 18 illustrates that the reference pixels are padded in the vertical direction (step 3) in the relationship between the reference pixel block and the block to be predicted of FIG. 4.

In FIG. 18, an example of padding a reference pixel I is illustrated.

The left reference pixels are padded by the processes of the above steps 11 to 13. Since the left reference pixels become available, in the same way as the padding of the upper reference pixels, a prediction image is generated by all of the modes using the reference pixels as "available for Intra__4×4 prediction".

Finally, a case where upper and left reference pixels of a block to be predicted do not exist, e.g., a case of a first macroblock of a slice, will be described. In this case, in the same ways as the conventional H.264 standard, a prediction image is generated by replacing all the pixel values of the block to be predicted by a median that is, e.g., 512 when an input format is 10 bits.

As described above, by performing the padding in accordance with the embodiment of the present invention, even when upper or left pixels of a block to be predicted do not exist, it is possible to generate a prediction image by using all of the modes defined by H.264. In accordance with the embodiment of the present invention, since the average value and the pixel differences of the line closest to the pixels to be padded from the available reference pixel block are used, pixels available for prediction are reconstructed in the padded pixels. As a result, it is possible to generate a highly dense prediction image.

Next, a case where the padding of the image prediction described in this embodiment is performed based on H.264 will be described with reference to FIGS. 19 to 21.

Figure 19:
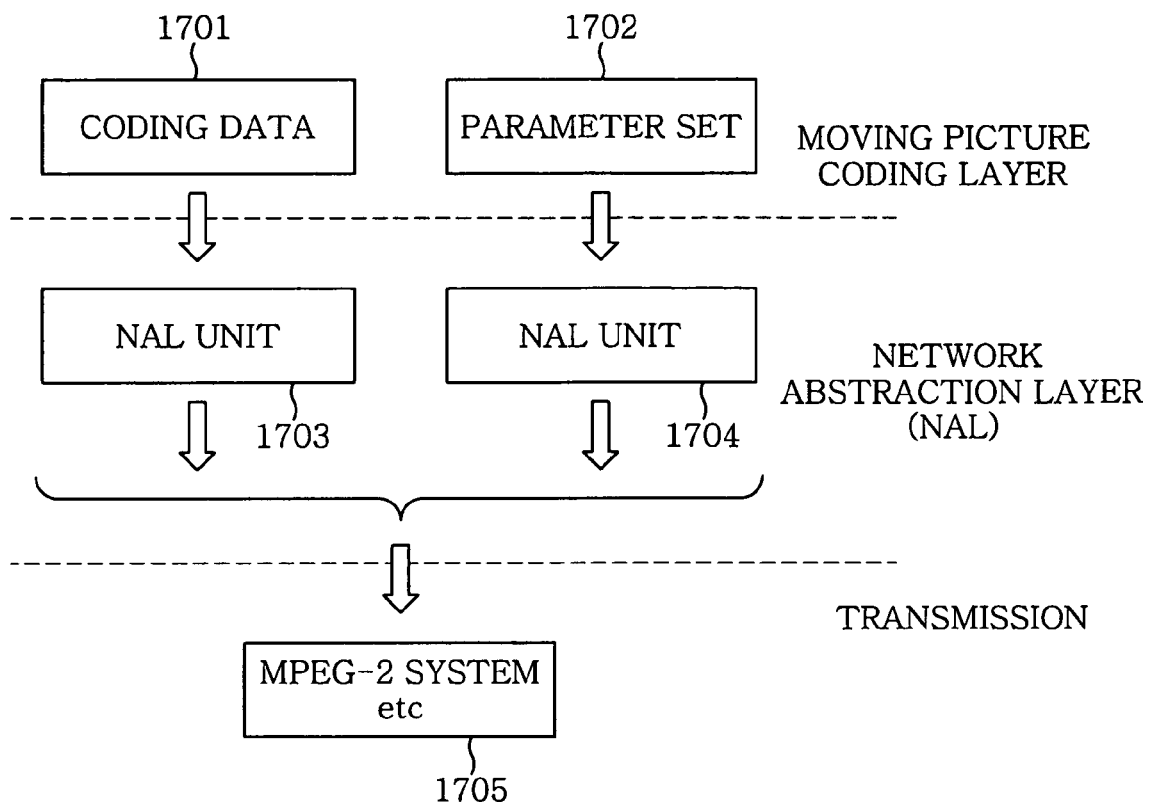
FIG. 19 illustrates a data hierarchy in H.264.

In the bit stream structure of H.264, as illustrated in FIG. 19, a network abstraction layer (NAL) including NAL units 1703 and 1704 is defined between a moving picture coding layer including coding data 1701 and parameter set 1702 to perform moving picture coding and a lower system such as MPEG-2 system 1705 for transmitting and accumulating coded information. Thus, the bit stream to the lower system 1705 is performed on a basis of NAL unit. In FIG. 19, the position of the NAL unit in H.264 is illustrated.

In order to access information in the bit stream in units of pictures, several NAL units are arranged in an access unit. The structure of the access unit is illustrated in FIG. 20. An AU delimiter 1801 is a start code that represents the head of the access unit. A sequence parameter set (SPS) 1802 is a header including information on coding of an entire sequence such as the profile and level of a primary coded picture (PCP) image. A picture parameter set (PPS) 1803 is a header that represents the coding mode of an entire picture. A supplement enhanced information (SEI) 1804 is a header including certain additional information such as timing information of each picture and random access information. A primary coded picture (PCP) 1805 is an NAL unit consisting of at least one slice data. A redundant coded picture (RCP) 1806, which is an NAL unit including macroblock data such as PCP, is redundancy data that can be used when PCP is lost by errors. An end of sequence (EOS) 1807 is a part that represents the end of a sequence. An end of stream (EOS) 1808 is a part that represents the end of a stream. In H.264, it is defined that the access unit includes the AU delimiter 1801 to the EOS 1808 arranged in order.

Figure 20:
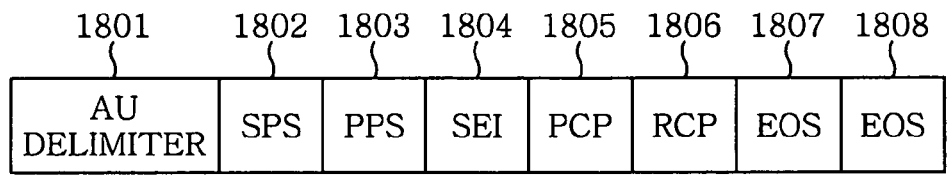
FIG. 20 illustrates an access unit in H.264.

When the padding of the image prediction described in this embodiment is performed based on H.264, in the SPS 1802 illustrated in FIG. 20, a flag for determining intra-padding is added. At a decoder, it is determined whether the intra-padding is to be performed or not based on the flag determination. The SPS 1802 is the header including the information on the coding of the entire sequence such as the profile and level of the PCP image. In H.264, the final parameter of the SPS is vui_parameters_present_flag that represents whether the syntax structure of video usability information (VUI) that is a data structure related to video display information exists or not. After this vui_parameters_present_flag, a flag of 1 bit that represents whether the intra-padding in accordance with the embodiment of the present invention is to be performed or not is added.

Figure 21:
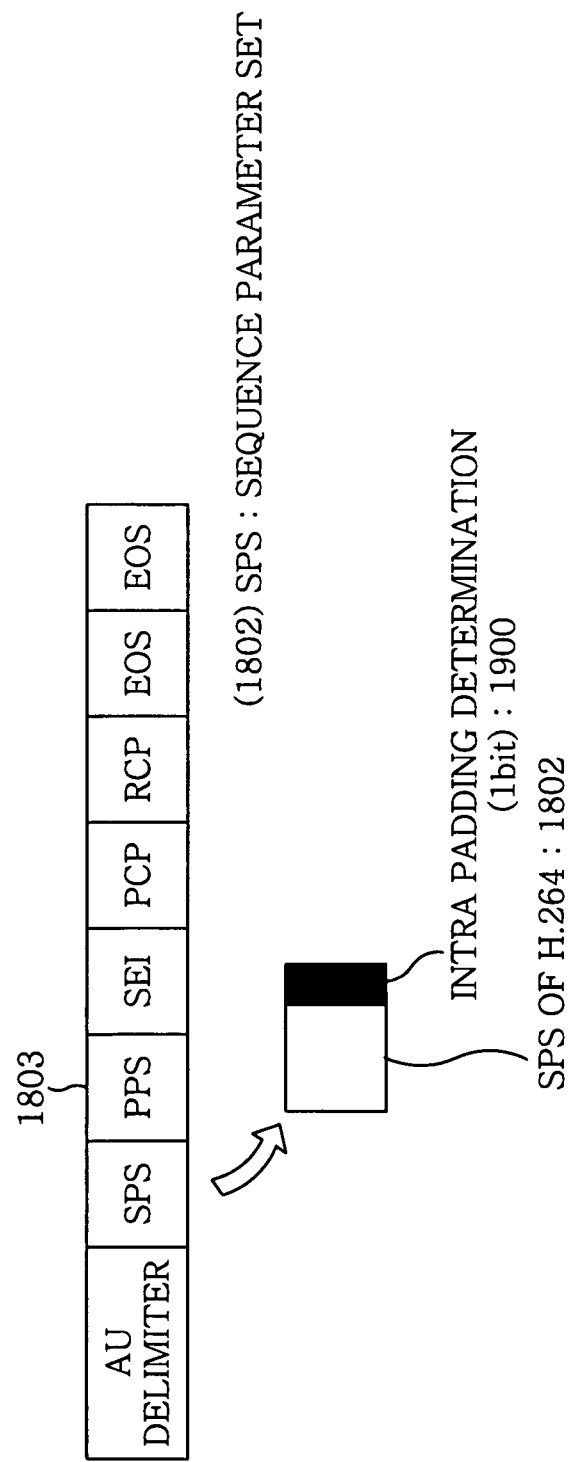
FIG. 21 illustrates an example of an access unit, in which padding is set in the image prediction in accordance with the present invention.

As shown in FIG. 21, at the last part of the SPS 1802 of the conventional H.264, a padding determination flag 1900 related to the padding of the image prediction described in this embodiment is added. When the decoder performs decoding, as in the conventional method, after the PSP 1803 is decoded, the padding flag information 1900 is decoded to determine whether the padding is to be performed or not. The decoder can perform decoding by using a prediction image generation block, in the same way as the encoder.

Figure 22:
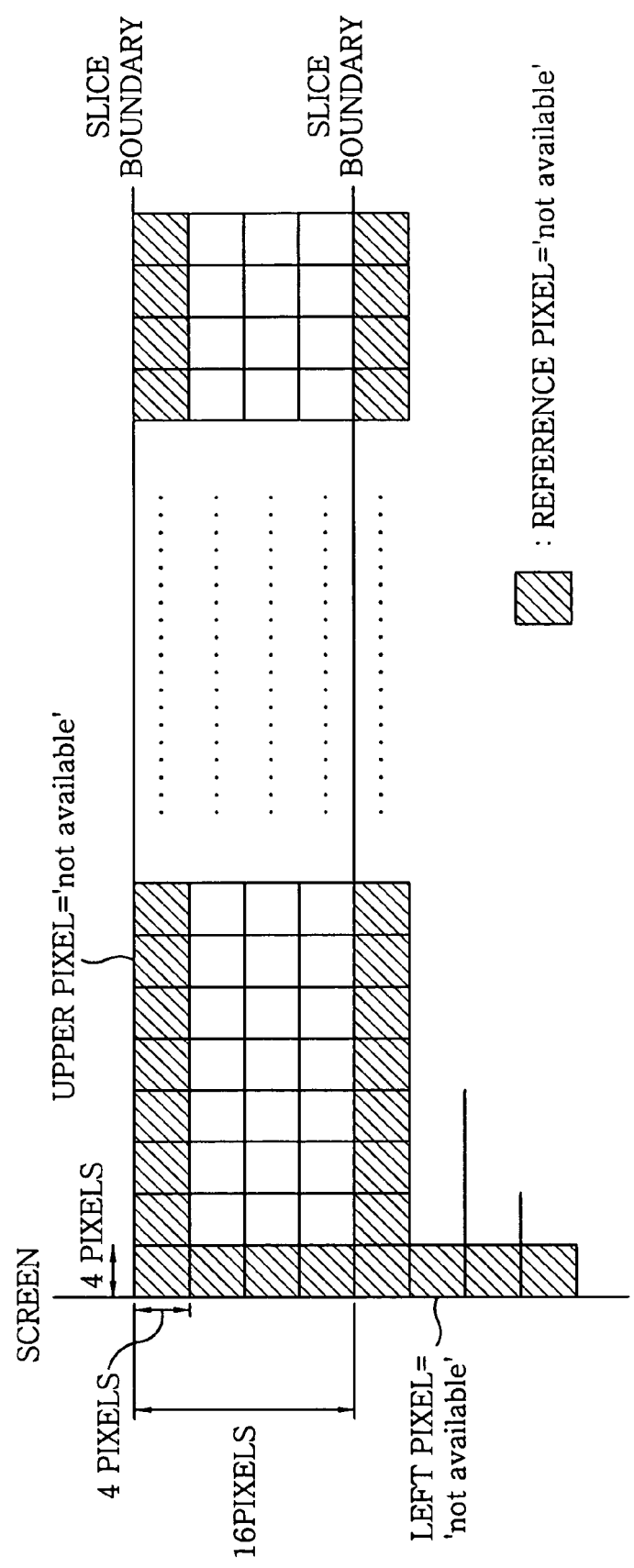
FIG. 22 illustrates a pixel block, in which limitations on modes are generated by a slice boundary/picture edge in conventional H.264.

Finally, the advantages of the padding of the image prediction in accordance with this embodiment will be described in comparison with the method of the conventional H.264 with reference to FIGS. 22 and 23.

In the conventional H.264, the modes that can be used for generating the prediction image on the slice boundary and at the picture edge are limited when the intra-prediction is used. For example, when 1 slice is set as a 1 macroblock line (16 lines) in the screen size of 1920*1080, in 4×4 pixel units, limitations on available modes are generated in the region of about 25% in the uppermost 4×4 block and at the picture edge as illustrated in FIG. 22. Similarly, mode limitations are generated in about 50% in 8×8 pixel units and are generated in all of the macroblocks in 16×16 pixel units. However, in accordance with the embodiment of the present invention, since the padding cannot be performed only by the first macroblock of the slice, the medium values are processed. In the other macroblocks, since limitations on available modes do not exist in generating the prediction image, it is possible to generate a highly dense prediction image.

Figure 23:
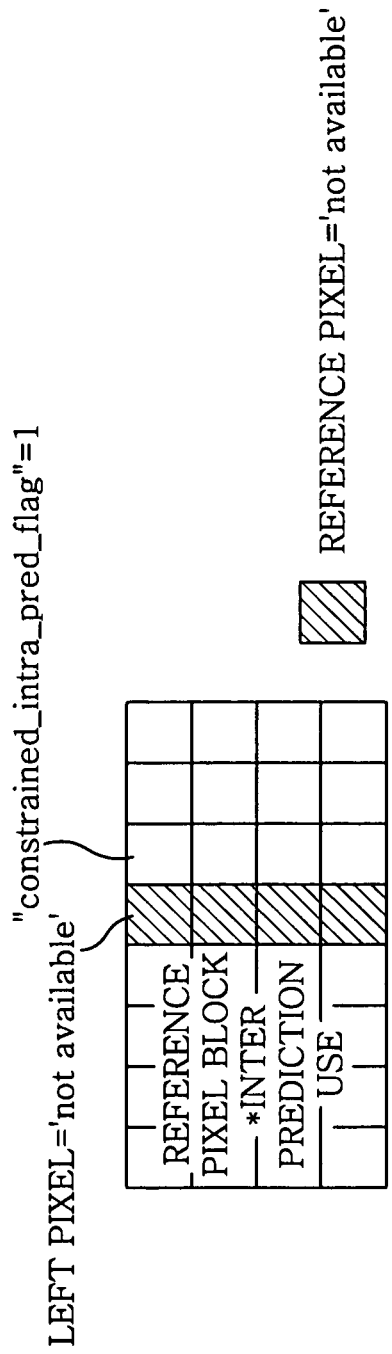
FIG. 23 illustrates a pixel block, in which limitations on modes are generated by using adjacent pixels in inter-prediction of the conventional H.264.

Further, when the prediction image is generated by using the intra-prediction and the inter-prediction, if the pixel block positioned in the reference pixel block is coded by the inter-prediction (constrained_intra_pred_flag='1') as illustrated in FIG. 23, it is expected that the pixel blocks, in which mode limitations are generated, further increase, in addition to the above situation. Therefore, the present invention is more effective.

While the invention has been shown and described with respect to the particular embodiments, it will be understood by those skilled in the art that various changes and modification may be made.

What is claimed is:

1. A moving picture coding apparatus for dividing a picture into basic blocks including a block to be predicted, a first reference pixel block and a second reference pixel block and generating a prediction image of the block to be predicted by using pixels in the first reference pixel block as reference pixels to perform intra predictive coding of a moving picture, wherein the first reference pixel block and the second reference pixel block are adjacent to the block to be predicted in the picture, wherein when some of the reference pixels of the first reference pixel block are not available, substitute pixel values for said some of the reference pixels are calculated based on pixel values of available pixels in the second reference pixel block and the prediction image of the block to be predicted is generated by using the calculated substitute pixel values, wherein said some of the reference pixels constitute a first pixel line and the available pixels of the second reference pixel block constitute a second pixel line, which is parallel with and closest to the first pixel line, and wherein when said some of the reference pixels are adjacently located at upper side of the block to be predicted, a block adjacently located at left side of the block to be predicted is used as the second reference pixel block, an uppermost horizontal line of the second reference pixel block is used as the second pixel line, each pixel in the second pixel line corresponds to one of pixel of the first pixel line, an average value of the pixel values in the second pixel line and differences between the respective pixel values in the second pixel line and the average value are calculated, the differences are respectively added to a pixel value of a rightmost pixel of the second pixel line to obtain final values to be padded, and the final values are padded to respective pixels in corresponding positions of the first pixel line as the substitute pixel values to thereby generate the prediction image of the block to be predicted.

2. The moving picture coding apparatus of claim 1, wherein when said some of the reference pixels are adjacently located at upper side of the block to be predicted, a pixel value of a pixel in the first pixel line corresponding to the rightmost pixel of the second pixel line is copied to set the pixel value thereof as pixel values of pixels of the first pixel line which are not padded with the final values.

3. The moving picture coding apparatus of claim 1, wherein an access unit of a bit stream generated by performing the intra predictive coding of the moving picture includes a flag in a header of the access unit for determining whether the substitute pixel values are used in generating the prediction image of the block to be predicted.

4. The moving picture coding apparatus of claim 1, wherein each of the substitute pixel values is calculated based on a correlation between pixel differences of the substitute pixel values of the first reference pixel block and pixel differences of the pixel values of the available pixels in the second reference pixel block.

5. The moving picture coding apparatus of claim 4, wherein when said some of the reference pixels are adjacently located at upper side of the block to be predicted, a pixel value of a pixel in the first pixel line corresponding to the rightmost pixel of the second pixel line is copied to set the pixel value thereof as pixel values of pixels of the first pixel line which are not padded with the final values.

6. The moving picture coding apparatus of claim 4, wherein an access unit of a bit stream generated by performing the intra predictive coding of the moving picture includes a flag in a header of the access unit for determining whether the substitute pixel values are used in generating the prediction image of the block to be predicted.

7. A moving picture coding apparatus for dividing a picture into basic blocks including a block to be predicted, a first reference pixel block and a second reference pixel block and generating a prediction image of the block to be predicted by using pixels in the first reference pixel block as reference pixels to perform intra predictive coding of a moving picture, wherein the first reference pixel block and the second reference pixel block are adjacent to the block to be predicted in the picture, wherein when some of the reference pixels of the first reference pixel block are not available, substitute pixel values for said some of the reference pixels are calculated based on pixel values of available pixels in the second reference pixel block and the prediction image of the block to be predicted is generated by using the calculated substitute pixel values, wherein said some of the reference pixels constitute a first pixel line and the available pixels of the second reference pixel block constitute a second pixel line, which is parallel with and closest to the first pixel line, and wherein when said some of the reference pixels are adjacently located at left side of the block to be predicted, a block adjacently located at upper side of the block to be predicted is used as the second reference pixel block, an leftmost vertical line of the second reference pixel block is used as the second pixel line, each pixel in the second pixel line corresponds to one of pixel of the first pixel line, an average value of the pixel values in the second pixel line and differences between the respective pixel values in the second pixel line and the average value are calculated, the differences are respectively added to a pixel value of a lowermost pixel of the second pixel line to obtain final values to be padded, and the final values are padded to respective pixels in corresponding positions of the first pixel line as the substitute pixel values to thereby generate the prediction image of the block to be predicted.

8. The moving picture coding apparatus of claim 7, wherein each of the substitute pixel values is calculated based on a correlation between pixel differences of the substitute pixel values of the first reference pixel block and pixel differences of the pixel values of the available pixels in the second reference pixel block.

* * * * *